United States Patent [19]

Buckleitner

[11] Patent Number: 4,544,056
[45] Date of Patent: Oct. 1, 1985

[54] SOLENOID OPERATED NEUTRAL PUMP-OUT FOR AUTOMATIC WASHER

[75] Inventor: Thomas H. Buckleitner, Lincoln Township, Berrien County, Mich.

[73] Assignee: Whirlpool Corporation, Benton Harbor, Mich.

[21] Appl. No.: 452,612

[22] Filed: Dec. 23, 1982

[51] Int. Cl.⁴ ............................................. F16D 13/60
[52] U.S. Cl. ................................... 192/71; 192/103 B; 192/105 CD; 192/114 R
[58] Field of Search .............. 192/71, 103 B, 105 CD, 192/114 R; 74/405

[56] References Cited

U.S. PATENT DOCUMENTS

| | | |
|---|---|---|
| 1,219,225 | 2/1917 | Benjamin et al. |
| 2,095,370 | 10/1937 | Reama et al. ........................ 74/405 |
| 2,823,779 | 2/1958 | Johnson et al. ................. 192/114 R |
| 2,826,056 | 3/1958 | Bruckman . |
| 3,092,230 | 6/1963 | Sisler ............................ 192/114 R |
| 4,187,728 | 2/1980 | Mazzorana . |
| 4,218,899 | 8/1980 | Mason . |
| 4,283,928 | 8/1981 | Stone . |
| 4,317,343 | 3/1982 | Gerry . |

FOREIGN PATENT DOCUMENTS

| | | | |
|---|---|---|---|
| 1163625 | 4/1958 | France ........................ 192/105 CD |
| 37441 | 8/1914 | Sweden ................................. 192/71 |

Primary Examiner—Lawrence J. Staab
Attorney, Agent, or Firm—Hill, Van Santen, Steadman & Simpson

[57] ABSTRACT

A means for operating a washing machine transmission in a neutral state is provided which includes a reversible drive gear for driving the transmission in a first agitate direction and an opposite spin direction. A drive pawl is pivotally mounted on the drive gear and has an arcuate channel formed in an upper flat surface. Pawl retaining means, being a circular keeper plate with downwardly extending keeper fingers selectively movable into the channel in the pawl causes the transmission to operate in the neutral state when the fingers are in the channel and when the drive gear is rotating in the spin direction.

10 Claims, 7 Drawing Figures

SOLENOID OPERATED NEUTRAL PUMP-OUT FOR AUTOMATIC WASHER

BACKGROUND OF THE INVENTION

1. Field of the Invention

The present invention relates generally to automatic washing machines and more particularly to drive mechanisms for automatic washing machines.

2. Description of the Prior Art

An automatic washer spin delay mechanism is disclosed in U.S. Pat. No. 4,218,899 assigned to Whirlpool Corporation, the assignee of this application, in which a delay mechanism provides a delay in the spin cycle of an automatic washer which is operated by means of a pawl pivotable about a stud rotating on an eccentric, which in turn is engageable with a spin gear only in one direction of rotation, and thereby provides a delay of substantially one revolution of the eccentric upon a change in direction of rotation of the eccentric. The delay mechanism is utilized between an agitate portion of the wash cycle and a spin and pump-out portion of the wash cycle to allow for disengagement of rack and pinion means utilized to translate rotational movement of the motor to oscillatory movement of the agitator during the wash portion of the cycle. The oscillatory means must be disengaged so that the agitator is free to rotate with the basket at high speed during a spin portion of the cycle. During this period of time, the washing machine is filled with wash liquid when the basket and agitator begin to rotate in the spin mode.

In the washing process it has been found advantageous to pump wash and rinse liquid from the machine while the transmission is in an idle or neutral position, neither agitating nor spinning. This reduces loading on the machine's transmission and also has some advantages in alleviating redeposition of lint and soil from the wash and rinse water onto the laundered garments. In addition, the wrinkling of garments is reduced when the machine has been drained before spinning.

Thus, a means for shifting the transmission to an idle or neutral position while the wash liquid is being pumped from the wash tub is required to gain the advantages listed above.

U.S. Pat. No. 1,219,225 shows a manually operated plunger device for locking a ratchet drive in neutral and U.S. Pat. No. 4,187,728 shows an axially movable cylinder for locking a ratchet drive in neutral.

SUMMARY OF THE INVENTION

An automatic washer of the present invention utilizes a single motor and drive mechanism to operate a vertical axis agitator and a clothes basket during washing and drying portions of a complete cycle. A rack and pinion means is provided to translate rotational movement of the motor to oscillatory movement of the agitator during the wash portion of the cycle. The oscillatory means must be disengaged by means of a jaw clutch so that it is free to rotate with the basket at a high speed during a spin portion of the cycle. The jaw clutch is provided to cause engagement and disengagement of the oscillatory means with the agitator upon a change in direction of rotation of the motor. The disengagement means requires one complete rotation of a drive gear to ensure complete disengagement. In addition, it is found to be desirable to shift the transmission into a neutral or idle position in which the basket and agitator are neither spinning or agitating while the wash or rinse liquid is being pumped out of the washer tub. In accordance with the present invention, the transmission is shifted to the idle position for an amount of time sufficient to allow substantially all of the wash or rinse liquid to be pumped from the wash tub prior to initiation of the spinning mode. Also, means are provided to ensure that the basket and agitator will remain in the spin mode if power is interrupted during the spin mode operation.

More specifically, a solenoid is mounted on a gear case cover with a plunger extending downwardly through the gear case cover and through a retaining hub or keeper plate. A compression spring is positioned and acts between the gear case cover and the keeper plate to bias the keeper plate downwardly toward a spin gear. The spin gear defines a series of slots arranged in a circular pattern around the axis of the spin gear. The keeper plate has downwardly depending keeper fingers. The keeper fingers are arranged to mate with and extend downwardly through the slots in the spin gear.

A spin drive pawl is pivotally mounted for rotation on a main drive gear. The drive gear is driven by a worm gear which in turn is directly driven by a reversible motor. The spin drive pawl is provided with a track or channel formed in its upper surface. The channel is arcuate and is a segment of a circle of the same diameter as the circle on which the slots and keeper fingers are located.

In operation, with the drive motor operating in the agitate mode or direction, the mechanism will be in a position such that the slots, fingers and channel are vertically aligned. During agitate, the solenoid is de-energized and the spring biases the keeper plate downwardly so that the keeper fingers enter the channel. During agitate, the drive gear is rotated, carrying the pawl with it and thus the channel moves relative to the keeper fingers which are stationary.

Upon reversal of the drive motor, the mechanism would normally shift into spin in accordance with the teachings of U.S. Pat. No. 4,218,899. However, with the solenoid de-energized, the keeper fingers are within the channel as heretofore explained and prevent the movement of the pawl into the position shown in FIG. 12 of U.S. Pat. No. 4,218,899. With the keeper fingers within the channel, the pawl is free to rotate with the drive gear but cannot pivot into the spin position.

With the drive motor in the spin mode, the pump is in the pump to drain mode and pumps the wash or rinse liquid from the washer. But since the pawl is locked in the neutral position the basket of the washer does not spin.

In order to spin the basket and thus centrifuge the liquid from the laundry, a timer switch is provided which may be actuated by a timer cam in a conventional manner to energize the solenoid. With the solenoid energized, the keeper plate is raised against the bias of the spring to retract the keeper fingers from the channel but not out of the slots.

With the keeper fingers retracted, the pawl is free to pivot into the spin position. The keeper plate is mounted on the plunger for rotation so that it may rotate freely with the spin gear when the pawl engages the stop formed on the spin gear. The solenoid remains energized while the washer is in the spin mode so that even if the spin mode is interrupted by the operator and later restarted the machine will continue in the spin mode.

If for any reason the pawl comes to rest in a position intermediate the spin or agitate positions and the machine is stopped, the spring will bias the keeper plate downwardly and the keeper fingers will engage the top smooth surface of the pawl. Regardless of the mode in which the machine has started, the pawl and keeper plate will be driven to their appropriate positions. For example, if the machine is started in the agitate mode, the drive gear will carry the pawl into engagement with a control spring which reacts with the pawl to drive it into the position where the keeper fingers of the keeper plate are aligned with the channel and free to drop into the channel under the bias of the compression spring. If the machine is started in the spin mode, the solenoid will be energized and the pawl will move to its spin position, free of restraint from the keeper fingers

DESCRIPTION OF THE PREFERRED EMBODIMENTS

Figure 1:
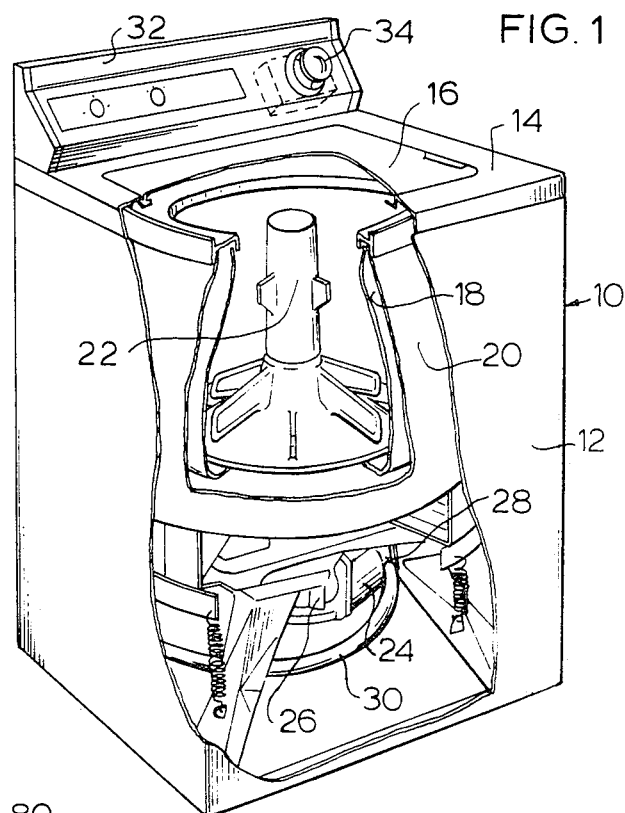
FIG. 1 is a perspective view, partially broken away, of an automatic laundry appliance embodying the present invention.

An automatic washing machine is generally illustrated in FIG. 1 at 10 and comprises a cabinet 12 with a top 14 and an openable lid 16 thereon. The lid 16 opens to provide access to the interior of a perforate wash basket 18 mounted concentrically within an imperforate wash tub 20.

A vertically mounted agitator 22 is carried within the wash basket 18 and is driven by an electric motor 24 operating through a transmission 26. The electric motor 24 is reversible and also drives a reversible pump 28. The pump can operate in a first direction to cause wash liquid within the tub 20 to be pumped out to a drain by drain conduit 30, or to recirculate wash liquid within the tub or to pump air from the drain conduit 30 when the pump is rotating in a second direction.

The top 14 of the washing machine is provided with a console 32 which carries the user operated controls including a timer actuated control 34 used in selecting and operating the machine through a series of washing, rinsing and drying steps.

Figure 2:
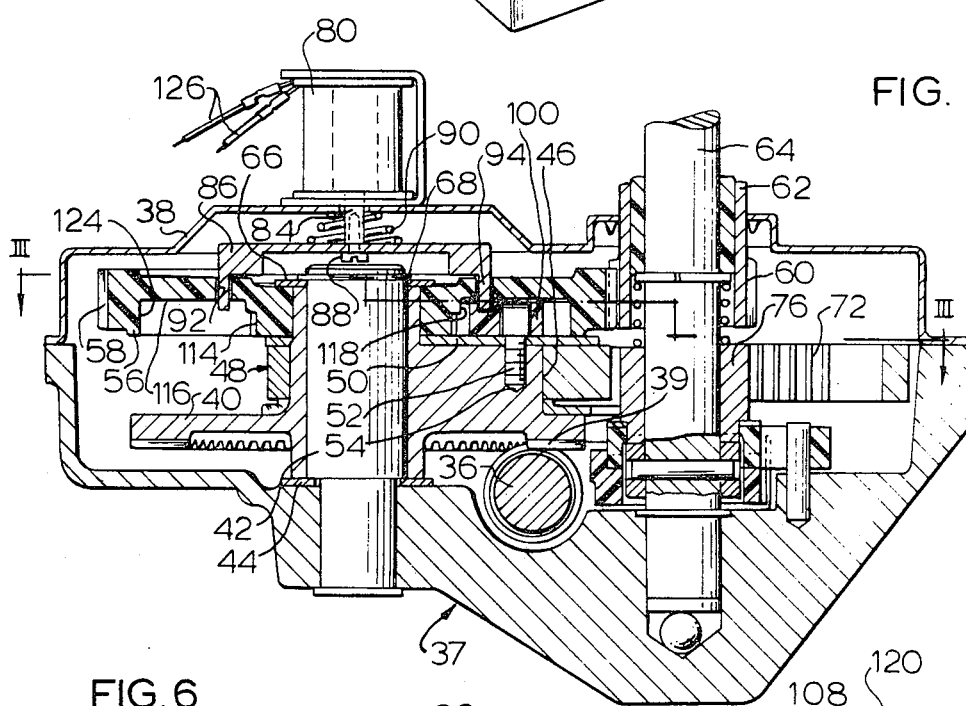
FIG. 2 is an enlarged sectional view of the clutch and spin delay mechanism of the laundry appliance of FIG. 1.
Figure 3:
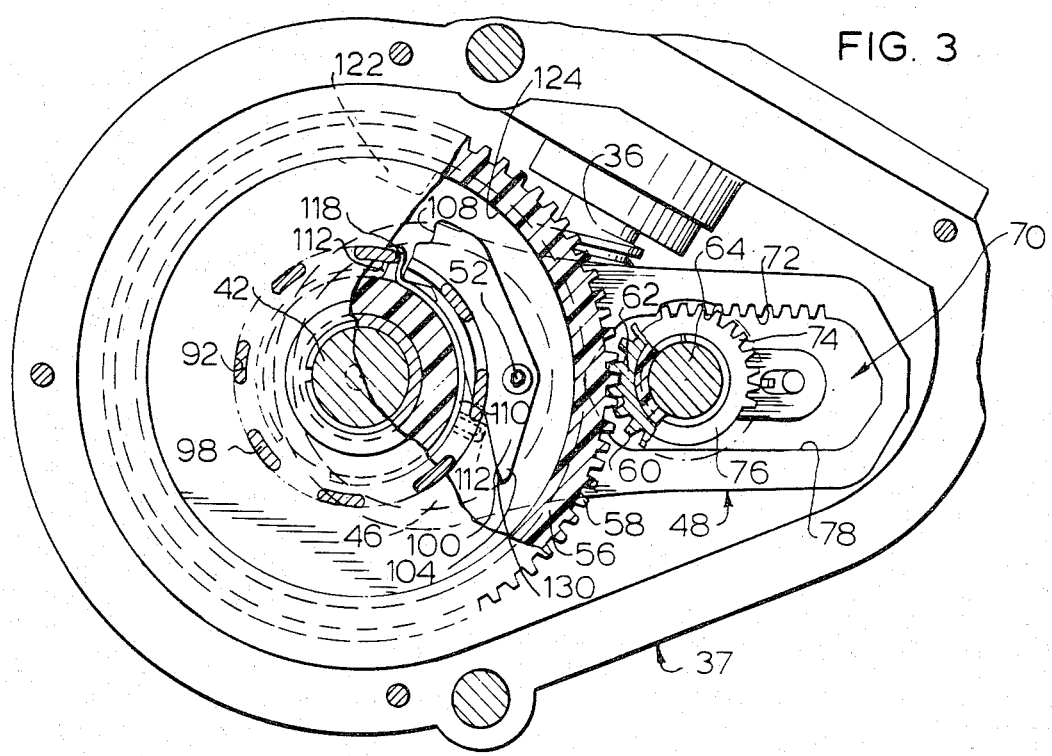
FIG. 3 is a sectional view partially broken away taken along the line III—III of FIG. 2.

Referring to FIGS. 2 and 3, the transmission 26 includes a worm gear 36 carried on one end of a drive shaft (not shown), the other end of which is connected to the motor 24 (FIG. 1). The worm gear 36 is disposed within a transmission housing 37 including a gear case cover 38 and engages teeth 39 disposed circumferentially on a lower surface of a main drive gear 40. The drive gear 40 is rotatably mounted on a jack shaft 42 and rests on a bearing washer 44. An upper portion of the drive gear 40 has an eccentric 46 integrally formed thereon. One end of a rack 48 has an opening for receiving the eccentric and operates in slidable movement therewith. A bearing plate 50 is positioned above the rack 48 on the eccentric 46 and held in place by a stud 52 which is received in a receptacle 54 in the eccentric 46. Mounted above the bearing plate 50 and concentric with the drive gear 40 is a spin gear 56 having teeth 58 which engage teeth 60 on a spin pinion 62 rotatable about an agitator shaft 64. All elements mounted on the jack shaft 42 are maintained in adjacent relation by a washer 66 which is held in place by a snap ring 68.

An opposite end of the rack 48 has a loop 70 which surrounds the agitator shaft 64. A row of teeth 72 are formed on one side of the loop 70 and engage teeth 74 formed on a portion of the exterior of an agitate pinion 76 rotatably mounted about the agitator shaft 64. The side of the loop 70 opposite the teeth 72 has a smooth bearing surface 78 movable against a portion of the exterior of the pinion 76 having no teeth thereon, thereby ensuring complete engagement of the teeth 74 on the agitate pinion and the teeth 72 on the rack. As the eccentric 46 is rotated by the main gear 40, a reciprocal motion in a plane normal to the agitator shaft 64 is imparted to the rack 48. This reciprocatory motion is transferred to the agitate pinion 76 by means of engagement of the teeth 72 and 74, causing an oscillatory motion in the agitate pinion. This oscillatory motion is then transferred to the agitator shaft 64 through a jaw clutch means as described and disclosed in U.S. Pat. No. 4,218,899 which is incorporated herein by reference.

Figure 4:
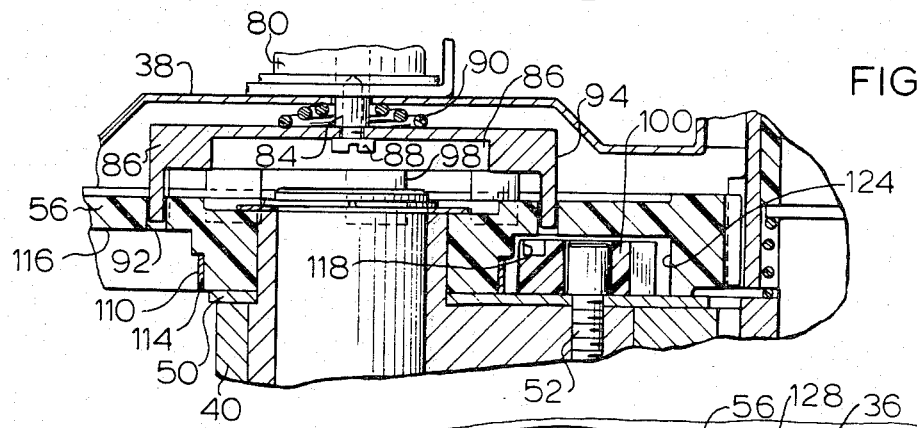
FIG. 4 is an enlarged partial sectional view of the solenoid mechanism shown in FIG. 2 with the mechanism moving into the spin position.

As seen in FIGS. 2 and 3, and in greater detail in FIG. 4, there is a solenoid 80 mounted on the gear case cover 38 which has a plunger 84 extending downwardly through the gear case cover 38 and through a retaining hub or keeper plate 86. The keeper plate 86 is attached to the plunger 84 by a pin 88 which may be connected to the plunger 84 in any suitable manner such as by threading. A conical compression spring 90 is positioned and acts between the gear case cover 38 and the keeper plate 86 to bias the keeper plate downwardly toward the spin gear 56.

Figure 6:
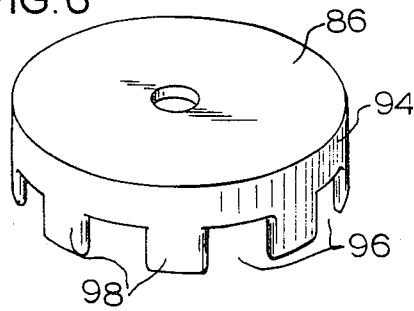
FIG. 6 is a perspective view of the keeper plate utilized in the present invention.

The spin gear 56 defines a series of slots 92 arranged in a circular pattern around the axis of the spin gear 56. The keeper plate 86 has a downwardly turned flange 94, as best seen in FIG. 6, having a series of relieved portions 96 which define a series of keeper fingers 98. The keeper fingers 98 are arranged to mate with and extend downwardly through slots 92 in the spin gear 56.

Figure 7:
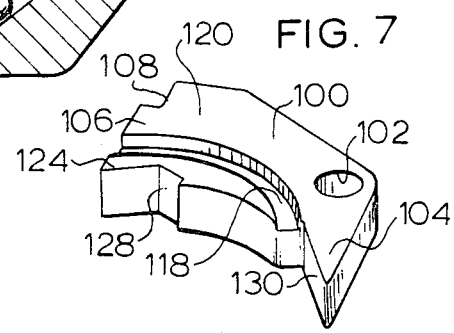
FIG. 7 is a perspective view of the spin drive pawl utilized in the present invention.

A spin drive pawl 100, also shown in FIG. 7, is pivotally mounted on the stud 52 by means of a circular opening 102 extending through the pawl, for rotation with the main drive gear 40. The drive gear 40 is driven by the worm gear 36 as described above.

The pawl 100 has a first pointed end 104 and a second end 106 having a notched abutment surface 108. A control spring 110 having a radially outwardly extending tang 112 is fitted around an inner wall 114 of an annular channel 116 formed in a lower side of the spin gear 56. The spin drive pawl 100 is provided with a track or channel 118 formed in its upper surface 120. The channel is arcuate and is a segment of a circle of the same diameter as the circle on which the slots 92 and keeper fingers 98 are located.

In operation, with the drive motor 24 operating in the agitate mode or direction, the mechanism will be in the position shown in FIGS. 2 and 3 because when the main gear 40 rotates in the clockwise or agitate direction, an angled surface 130 on the end 104 of the pawl 100 is moved into contact with the tang 112 of the spring 110 as shown by the position of the tang drawn in broken lines. In that position, the slots 92, fingers 98 and channel 118 are vertically aligned. The pawl 100 has thereby been pivoted counterclockwise about the stud 52 so that the opposite end 106 notched abutment surface 108 of the pawl is moved away or decoupled from a radially inwardly extending surface 122 carried on an outer wall 124 of the annular channel 116. There is thus no engagement of the surfaces 122 and 108 due to the counterclockwise rotation of the pawl on the stud 52. In this clockwise direction of rotation of gear 40 and eccentric 46, when the pawl 100 contacts the tang 112 near the first, pointed end 104, there is sufficient force to cause the spring 110 to slip on the wall 114. Thus, the main gear 40 rotates freely beneath the spin gear 56 while the pawl 100 rotates the spring 110 on the wall 114. As the pawl 100 rotates with the main drive gear 40, the channel 118 moves relative to the keeper fingers 98 which are stationary. The solenoid 80 is de-energized at this time and the spring 90 biases the keeper plate 86 downwardly so that keeper fingers 98 are positioned in the channel 118.

Upon reversal of the drive motor 24, into the spin and tub pump-out direction, the integral eccentric 46 on the main gear 40 will also be rotated in the counterclockwise direction. When rotating in this direction, the pawl 100 rotates toward the tang 112 on the gear 40 from an opposite direction until it abuts the tang with a lower portion 124 of notched surface 108 as is shown in full lines in FIG. 3. However, with solenoid 80 still de-energized, the keeper fingers 98 remain within channel 118 as heretofore explained and latch the pawl 110 to prevent the rotational movement of pawl around the stud 52 into the spin position.

With the drive motor in the spin mode or direction, the pump 28 is in the pump to drain mode and pumps the wash or rinse liquid from the washer 10. But, since the pawl 100 is latched in the neutral position, the basket 18 of the washer does not spin.

In order to spin the basket and thus centrifuge wash liquid from the laundry, a timer switch (not shown) is provided, which may be actuated by a timer cam in the timing control 34 in a conventional manner, to energize the solenoid 80 by an appropriate signal on electrical lines 126. With the solenoid energized, the keeper plate 86 is raised against the bias of the spring 90 to retract keeper fingers 98 from the channel 118 but not out of the slots 92 as shown in FIG. 4. The fingers 98 are not retracted completely out of slots 92 because they could become misaligned with the slots and prevent it from moving back into the channel 104 at the appropriate times if they were to contact the solid portion of the spin gear 56 between the slots 92.

Figure 5:
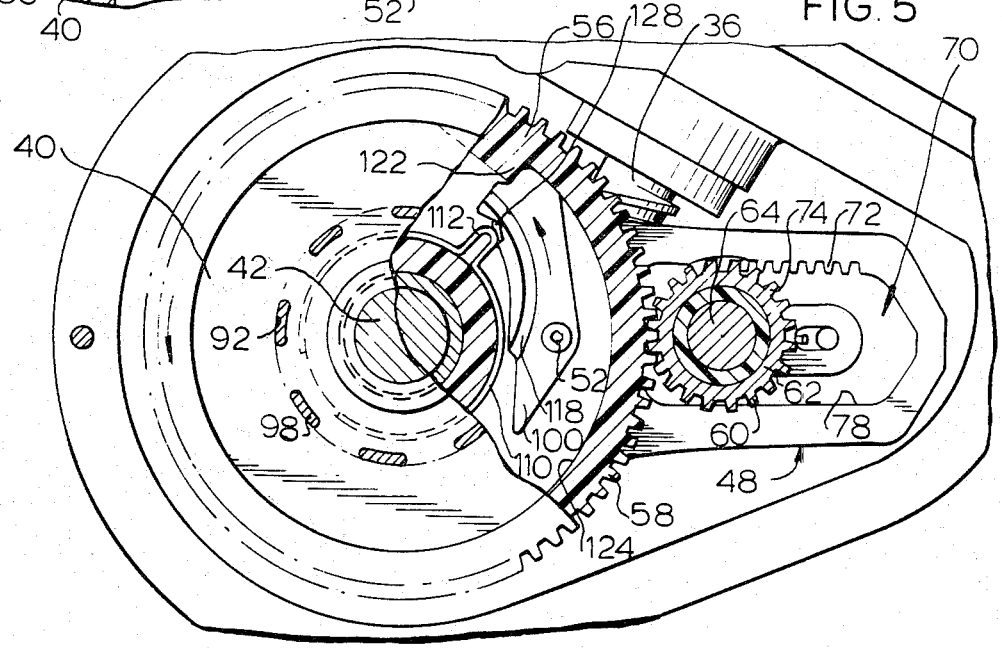
FIG. 5 is a sectional view similar to that shown in FIG. 3 with the mechanism in the spin position.

With the keeper fingers retracted, the pawl 100 is unlatched and is free to pivot on its stud 52 into the spin position shown in FIGS. 4 and 5. Centrifugal force causes the second end 106 to pivot outwardly since the pivot point of the stud 52 is located closer to the first end 104 than the second end 106. With the second end 106 pivoted outwardly, and the pawl 100 rotating counterclockwise, the notched abutment surface 108 engages the surface 122 extending radially inwardly from the outer wall 124 of the channel 116 in the spin gear 56. Thus, the spin gear, and therefore the basket, are driven in a counterclockwise rotation by the drive gear. The tang 112 is captured in a notched portion 128 of the pawl 100 as seen in FIG. 5. The keeper plate 86 is mounted on the plunger 84 so that it may rotate freely with the spin gear 86 when the pawl 100 engages the stop 122 formed on the spin gear 56.

Solenoid 80 remains energized while the washer is in the spin mode so that even if spin is interrupted by the operator and later restarted, the machine will continue in the spin mode of operation. If for any reason pawl 100 comes to rest in a position intermediate the spin or agitate positions and the machine has stopped, the spring 90 will bias keeper plate 86 downwardly and the keeper fingers 98 will engage the top smooth surface of pawl 100. Regardless of the mode in which the machine has started, the pawl 100 and keeper plate 86 will be driven to their appropriate positions. For example, if the machine is started in the agitate mode, the drive gear 40 will carry pawl 100 into engagement with the tang 112 of the control spring 110 which reacts with pawl 100 by acting on angled surface 130 to drive the pawl 100 into the position shown in FIGS. 2 and 3 wherein the keeper fingers 98 of the keeper plate are aligned with the channel 118 and free to drop into the channel under the bias of the compression spring 90. If the machine is started in the spin mode, the solenoid 80 will be energized and the pawl 100 will pivot to its spin position, free of restraint from keeper fingers 98.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The embodiments of the invention in which an exclusive property or privilege is claimed are defined as follows:

1. In an automatic washer transmission for operating the washer in the agitate and spin modes, means for operating said transmission in a neutral state comprising:

a reversible drive gear for driving said transmission in a first agitate direction and an opposite spin direction;

a drive pawl pivotally mounted on said drive gear, said drive pawl having an arcuate channel formed therein;

pawl retaining means rotatable about an axis relative to said pawl and mounted for movement parallel to said axis into and out of said channel; and actuator means for moving said pawl retaining means into and out of said channel, whereby when said retainer means is in said channel, said transmission operates in a neutral state when said drive gear is rotating in said spin direction.

2. In an automatic washer transmission for operating the washer in the agitate and spin modes, means for operating said transmission in a neutral state comprising:

a reversible drive gear for driving said transmission in a first agitate direction and an opposite spin direction;

a drive pawl pivotally mounted on said drive gear, said drive pawl having an arcuate channel formed therein;

pawl retaining means mounted for movement into and out of said channel;

a spin gear;

said pawl retaining means comprising a series of interrupted fingers extending through openings defined by said spin gear; and actuator means for moving said pawl retaining means into and out of said channel;

whereby when said retainer means is in said channel, said transmission operates in a neutral state when said drive gear is rotating is said spin direction.

3. In a transmission for an automatic washer operable in a first and second direction, means for operating said transmission in a neutral state comprising:

a drive gear mounted on a shaft for rotation;

means for driving said drive gear in a first or second rotational direction;

drive pawl means pivotally mounted on said drive gear for rotation therewith;

said pawl means pivotable between a first and second position;

a spin gear mounted on said shaft for rotation;

said spin gear having a series of apertures therethrough formed in a circular pattern;

said pawl means having a groove therein corresponding to said circular pattern;

means associated with said drive pawl means and said spin gear when said pawl means is in said second position to cause said pawl means to drive said spin gear in said second rotational direction; and a solenoid mounted and spring biased keeper plate means having a plurality of fingers extending therefrom mounted such that said fingers extend through said apertures in said spin gear and under bias of a spring into said groove of said pawl means when said pawl means is in said first position, said fingers being retracted from said groove when said solenoid is energized, whereby said transmission will be operated in a neutral state when said drive gear is rotating in said second direction and when said solenoid is de-energized and said fingers extend into said groove.

4. The device of claim 3 wherein said fingers remain in said apertures but are withdrawn from said groove when said solenoid is energized.

5. In a transmission for an automatic washer operable in a first and second direction:

a first drive gear mounted on a shaft for rotation;

means for rotationally driving said drive gear;

drive pawl means pivotally mounted on said drive gear for rotation therewith;

said pawl means pivotable between a first and second position;

a second gear mounted on said shaft for rotation;

means associated with said drive pawl means and said second gear when said drive pawl means is in said second position to cause said pawl means to drive said second gear; and finger and channel engagement means relatively rotatable about an axis and mounted for relative movement parallel to said axis to selectively retain said drive pawl means in said first position to operate said transmission in a neutral state and to selectively cause said pawl to pivot to said second position to operate said transmission in a driving state.

6. The device of claim 5 wherein said engagement means comprises a channel formed in said pawl means and finger members rotatably movable relative to said pawl means to engage said channel to prevent pivotal movement of said pawl means on said first gear.

7. The device of claim 5 wherein said means to cause said pawl to rotate to said second position comprises pivotally mounting said pawl on said drive gear in an off-center manner such that centrifugal forces associated with rotation of said drive gear will cause said pawl to pivot to said second position.

8. In a transmission for an automatic washer operable in a first and second direction;

a first drive gear mounted on a shaft for rotation;

means for rotationally driving said drive gear;

drive pawl means pivotally mounted on said drive gear for rotation therewith;

said pawl means pivotable between a first and second position;

a second gear mounted on said shaft for rotation;

means associated with said drive pawl means and said second gear when said drive pawl means is in said second position to cause said pawl means to drive said second gear; and finger and channel engagement means provided to selectively retain said drive pawl means in said first position to operate said transmission in a neutral state and to selectively cause said pawl to pivot to said second position to operate said transmission in a driving state;

said engagement means comprising a channel formed in said pawl means and finger members movable relative to said pawl means to engage said channel to prevent pivotal movement of said pawl means on said first gear;

said finger members extending through and rotating with said second gear to engage said channel formed in said pawl means.

9. The device of claim 8 wherein said finger members are mounted on a solenoid and are spring biased into said groove, said solenoid, when energized, retracting said fingers from said channel.

10. The device of claim 9 wherein means are provided to retain said pawl means in said second position in the event that power to said solenoid is interrupted during the period in which the second gear is to be driven.

* * * * *